Aug. 7, 1945.  D. A. YOUNG ET AL  2,381,329
ELECTRICAL MEASURING INSTRUMENT
Filed Dec. 12, 1942  2 Sheets-Sheet 1
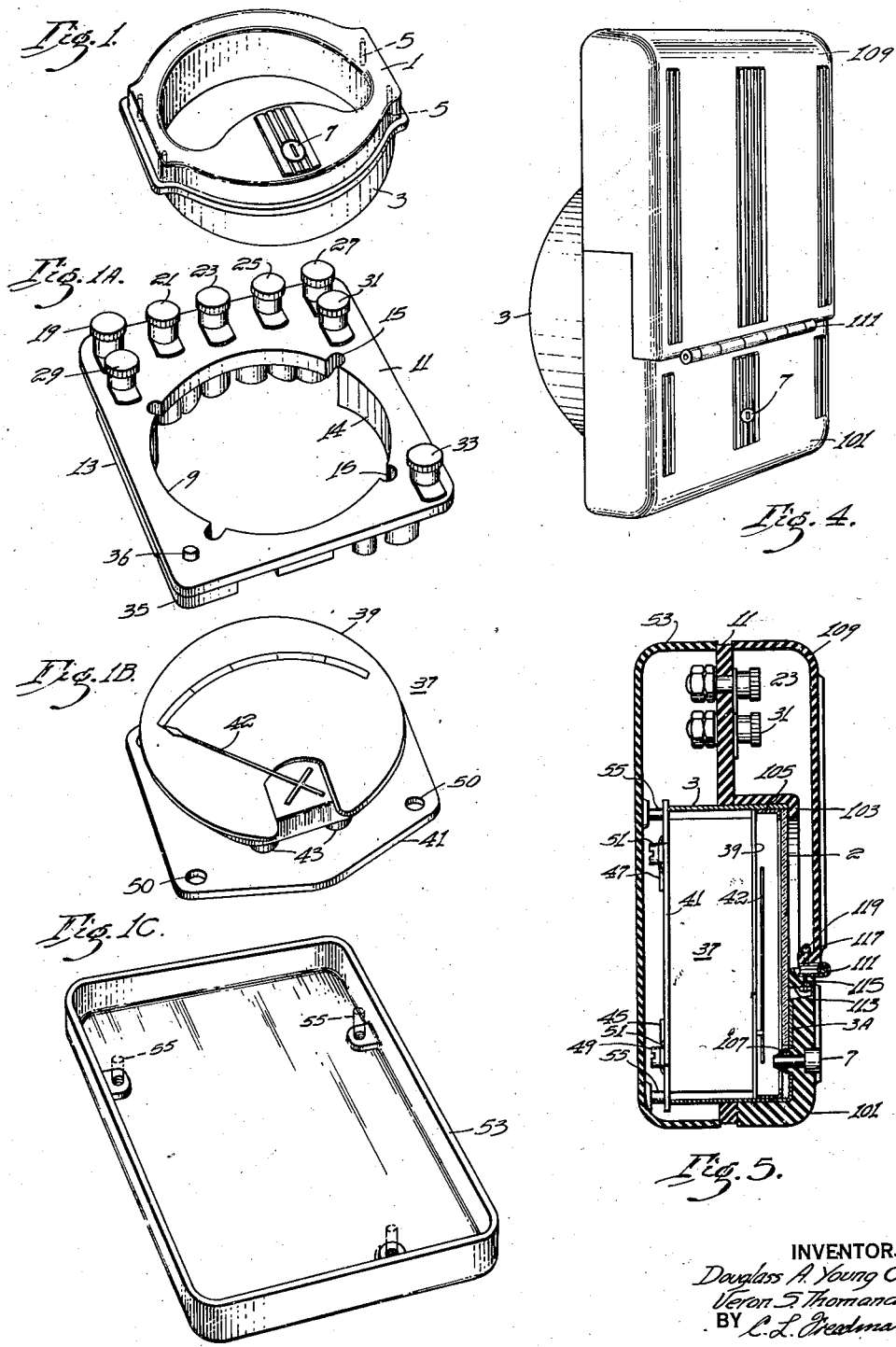
INVENTORS
Douglass A. Young and
Veron S. Thomander.
BY C. L. Freedman
ATTORNEY

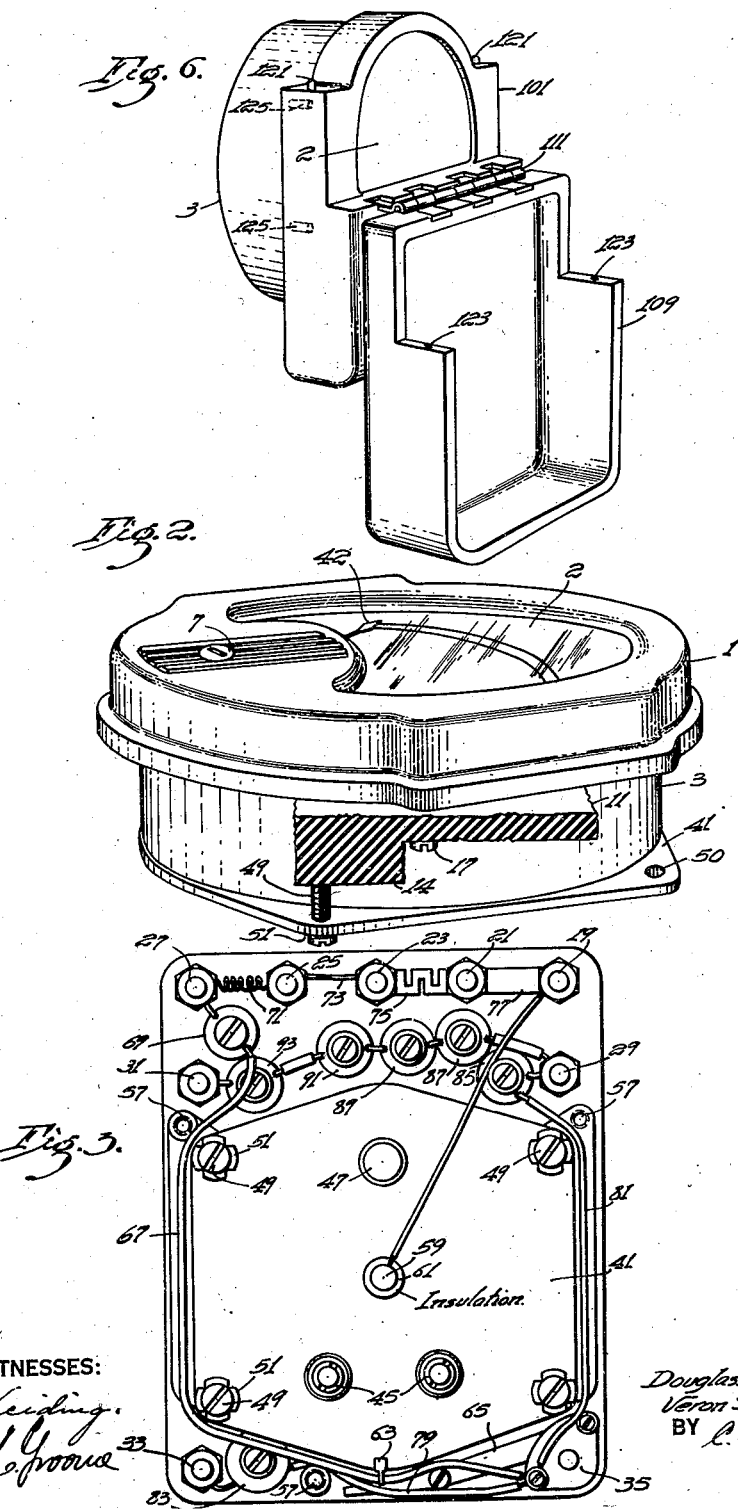

Patented Aug. 7, 1945

2,381,329

UNITED STATES PATENT OFFICE 2,381,329

ELECTRICAL MEASURING INSTRUMENT

Douglass A. Young, East Orange, and Veron S. Thomander, Maplewood, N. J., assignors to Westinghouse Electric Corporation, East Pittsburgh, Pa., a corporation of Pennsylvania Application December 12, 1942, Serial No. 468,764

7 Claims. (Cl. 171—95)

This invention relates to measuring instruments, and it has particular relation to electrical measuring instruments having housings provided with readily interchangeable open and closed fronts.

Measuring instruments, particularly those of the portable type, are available with open or closed fronts. In the case of electrical measuring instruments, such as ammeters and volt meters, the closed front serves to protect the transparent window and the terminals of the instrument when the instrument is not in service.

Many measuring instruments, such as ammeters and volt meters, have extremely small torques available for actuating a movable element. For this reason, it is important that the movable element operate with a minimum of friction and that the movable element be protected from exposure as much as possible.

In accordance with the invention, housings for measuring instruments are provided with readily interchangeable open and closed fronts. To this end each front is formed of a cover having a shield extending therefrom. This shield is designed to surround substantially an instrument movement. A base plate is associated with the shield to define a closed container for the instrument movement.

Each cover member is mounted on a panel having an opening through which the shield projects. The panel forms a closure for a base member having a recess to define a casing. Auxiliary equipment for modifying the range of the measuring instrument may be positioned within the casing. Since the measuring instrument is protected by an independent container, removal of the base member exposes the auxiliary equipment for adjustment or replacement without exposing the instrument movement. Inasmuch as each of the covers, whether of the closed front or open front type, is associated with a panel in the same manner, the covers are readily interchangeable to provide either a closed front or an open front.

It is, therefore, an object of the invention to provide an improved housing for a measuring instrument.

It is a further object of the invention to provide a measuring instrument assembly having a housing designed for readily interchangeable open and closed fronts.

It is another object of the invention to provide an electrical measuring instrument assembly including a housing having a cover associated with a shield for receiving an instrument movement.

Other objects of the invention will be apparent from the following description taken in conjunction with the accompanying drawings, in which:

Figure 1 is a view in perspective of an open front cover embodying the invention;

Fig. 1A is a view in perspective of a panel member suitable for receiving the cover of Fig. 1;

Fig. 1B is a view in perspective of an instrument movement which may be mounted on the panel member of Fig. 1A;

Fig. 1C is a view in perspective of a base member for receiving the panel member of Fig. 1A;

Figs. 1, 1A, 1B and 1C are arranged in exploded relationship to indicate the assembly of the structures shown therein to form a complete measuring instrument assembly embodying the invention;

Fig. 2 is a view in perspective with parts broken away showing the assembly of the structures shown in Figs. 1, 1A and 1B;

Fig. 3 is a view in bottom plan of the panel member of Fig. 1A having mounted thereon the instrument of Fig. 1B together with auxiliary equipment for modifying the operation of the instrument movement;

Fig. 4 is a view in perspective of a closed front cover which is interchangeable with the open front cover of Fig. 1;

Fig. 5 is a view in cross-section of a measuring instrument assembly employing the closed front cover of Fig. 4; and Fig. 6 is a view in perspective of the cover illustrated in Fig. 4, the parts thereof being shown in a different position.

Referring to the drawings, Fig. 1 shows an open front cover 1 having a cylindrical shield 3 projecting therefrom. The cover 1 has a generally circular front with a parallel pair of sides defining corners within which threaded openings 5 are positioned to facilitate attachment of the cover to a panel member. The threaded openings 5 are illustrated in dotted lines in Fig. 1 and open to the rear of the cover. If the instrument movement to be associated with the cover 1 requires an adjusting device, a suitable adjusting element 7 may be provided in the cover 1 for effecting the required adjustments. The cover 1 is provided with a light-permeable window 2 (Fig. 2) for exposing an instrument movement positioned therein.

The shield 3 is designed to be received within a circular opening 9 provided in the panel member 11 shown in Fig. 1A. The panel member 11 includes ribs 13 and 14 which serve to reenforce the panel member and to receive screws employed in assembling the various parts of the measuring instrument assembly. The panel member 11 also includes four openings 15 through which screws may be passed into threaded engagement within the threaded openings 5 of the cover 1. Such screws 17, (see Fig. 2) are applied from the rear of the panel member 11 to secure firmly the cover 1 to the panel member.

When the panel member 11 is designed to receive an electrical measuring instrument, a plurality of terminals or binding posts may be mounted thereon to facilitate connections between the instrument movement and an electrical circuit. As a specific example, the panel member 11 may be designed to receive a combined voltmeter and ammeter. In such a case, one of the terminals 19 may be designated as a common terminal to which one lead from the associated electrical circuit is always connected. The remaining lead from the electrical circuit may be connected to one of the terminals 21, 23, 25 or 27 for the purpose of measuring current flowing in the electrical circuit. Each of the latter terminals provides a different current range for the associated electrical instrument movement.

If the voltage of the associated electrical circuit is to be measured, one lead from the electrical circuit is connected to the terminal 19 and the remaining lead is connected to one of the terminals 29, 31 or 33. Each of the latter terminals provides a different voltage range for the associated electrical instrument movement. If desired, the voltage terminals 29, 31, 33 normally may be out of circuit and may be connected in circuit by means of a switch 35 having an operating push button 36 which projects through the panel member 11. This push button normally is biased outwardly to connect the current terminals 21, 23, 25 and 27 to the associated measuring instrument movement. When the push button 36 is depressed, the connection between the terminals 21, 23, 25 and 27, the instrument movement is broken and a connection is established between the instrument movement and the terminals 29, 31 and 33 for the purpose of measuring voltages. This terminal and switch arrangement is well known in the art. If desired, the terminals may be of the type disclosed in the copending application, Serial No. 454,930, filed August 14, 1942, of V. S. Thomander, which is assigned to the Westinghouse Electric & Manufacturing Company.

After the cover 1 has been attached to the panel member 11 an instrument movement 37 may be inserted within the shield 3. The instrument movement 37 may be of any desired type, such as a moving-iron instrument movement. For the purpose of discussion, it will be assumed that the instrument movement 37 is a permanent-magnet moving-coil instrument having a dial 39 across which a pointer 42 is movable. The instrument is attached to a base plate 41 by means of a pair of posts 43 which may be secured to the base plate 41 by means of suitable nuts 45 which are in threaded engagement with the posts 43 (see Fig. 3). In addition, a third post 47 may be attached to the base plate 41 in any suitable manner as by a riveting operation and other portions of the instrument movement may be secured to the post 47. As shown more clearly in Fig. 2, the base plate 41 is secured to the panel member 11 by means of machine screws 49 passing through openings 50 provided in the base plate 41 and secured in threaded openings provided in the panel member 11. Preferably spring washers 51 are employed with the machine screws 49 for providing a resilient engagement between the base plate 41 and the shield 3. In order to protect fully the instrument movement positioned within the shield 3, the shield 3 and the base plate 41 have a dustproof engagement such as that provided by grinding the engaged surfaces of the shield 3 on the base plate 41 into accurate plane surfaces. If ground surfaces are provided on these members, a gasket is unnecessary to seal the joint therebetween.

The open front instrument assembly is completed by a base member 53 having a recess for receiving the auxiliary equipment and portions of the shield 3 and base plate 41 which project from the panel member 11. This base member 53 is secured to the panel member 11 by means of machine screws 55 which are received in threaded openings 57 provided in the panel member 11. These threaded openings are shown in Fig. 3.

A typical example of connections suitable for a measuring instrument of the type herein discussed is illustrated in Fig. 3. As shown in Fig. 3, the instrument movement has its moving coil connected at one end to a terminal 59 which passes through an insulating and sealing bushing 61 positioned in the base plate 41. The remaining terminal of the moving coil is grounded to the base plate 41 and connections thereto may be effected through a connecting lug 63. In the specific embodiment of Fig. 3, the connecting lug 63 is connected through a switch blade 65 to the switch 35. The normally closed contact of the switch 35 is connected to the terminal 27 through an insulated conductor 67 and a suitable resistor 69. It will be observed that a series of graded shunts 71, 73, 75 and 77 are connected between appropriate pairs of the current terminals. These shunts are so graded that the range of the instrument movement increases as the connection of the adjustable lead from the associated electrical circuit changes from the terminal 27 to the terminals 25, 23, and 21.

The normally open contact of the switch 35 is connected through conductors 79 and 81 and suitable resistors 83, 85, 87, 89, 91 and 93 to the terminals 29, 31 and 33. When the push button 36 of the switch 35 is depressed and the leads from an associated electrical circuit are connected between the terminal 19 and one of the terminals 29, 31 and 33, the instrument movement will indicate a voltage dependent upon the value of the multiplier resistance included between the switch 35 and the terminal to which the adjustable lead from the electrical circuit is connected. As previously pointed out, the arrangement of the switch 35, the multiplier resistors, the shunts and the terminals is well known in the art.

If a closed front instrument assembly is desired, the panel member 11, instrument movement 37 and base member 53 again are employed. However, the cover 1 of Fig. 1 is replaced by a cover 101 which is illustrated in Figs. 4, 5 and 6. The cover 101 is similar in general to the cover 1 of Fig. 1. It includes the shield 3 for surrounding the instrument movement and the light-permeable window 2 for exposing the pointer and dial of the instrument. It will be noted that the cover 101 has a contour designed to fit the contour of the panel member 11.

A suitable method for assembling the window 2 and the shield 3 in the associated cover is shown in Fig. 5. Referring to Fig. 5, it will be observed that the window 2 engages a flanged portion 103 of the cover 101. Conveniently the window 2 may terminate short of the adjusting element 7. To assure a dust-proof connection between the window 2 and the cover 101 a suitable sealing medium such as putty, may be employed between the window and the cover. In addition, a resilient locking ring 105 having an intimate engagement with the shield 3 may be forced into the shield against the window 2 to secure the window firmly in mounted position. The adjusting element 7 may take the form of a headed pin having a resilient conical washer or locking ring 107 intimately engaging its inner end to retain the adjusting element on the cover 101.

For protecting the window 2 and the terminals mounted on the panel 11 a cap 109 is attached to the cover 101 by means of a hinge 111. The cover 101 is provided with a notch defining a flange 113 to which one portion of the hinge 111 is attached by means of bolts 115. The cap 109 includes a flange 117 to which the hinge 111 is attached by means of bolts 119. As shown in Fig. 5, the cap 109 in closed position completes a closure for the window 2 and the terminals mounted on the panel member 11. In the open position illustrated in Fig. 6, the cap 109 permits free access to the terminals and the window. The cap 109 may be retained in closed position by means of pins 121 positioned in the cover 101 and urged outwardly against stops by means of springs (not shown). These pins are received in cups or depressions 123 formed in the cover 109 when the cover is in closed position. The construction of such pins is well understood in the art. The cover 101 includes threaded openings 125 (see Fig. 6) which correspond to the openings 5 provided in the cover 1 of Fig. 1. It will be recalled that these threaded openings facilitate the mounting of the cover on the panel member 11. To simplify the drawings, it is assumed that the instrument assembly of Fig. 5 does not require the push button switch 37 or the terminal 33 of Fig. 1A. Therefore, the cover 101 is not provided with recesses for exposing the push button and terminal. Also the connections for the instrument movement 37 are not shown in Fig. 5.

The materials employed for the instrument assemblies may vary appreciably. Conveniently, the base member 53, the panel member 11, the cover 1 or 101 and the cap 109 may be formed of an insulating material such as a phenolic resin. Such material may be molded readily to any desired contour.

If the shield 3 and the base plate 41 are designed solely to protect the instrument movement 37 from exposure, they may be formed of any suitable material. However, it is customary to provide electrical instrument movements with shielding against electrical and magnetic fields. To shield the instrument movement 37 against an alternating field, the shield 3 and base plate 41 may be formed of an electroconductive material such as brass or copper. Eddy currents induced in an electroconductive material of this type effectively protect the instrument movement from alternating fields. As a protection against continuous magnetic fields, the shield 3 and the base plate 41 may be formed of a magnetic material having low residual induction, such as magnetically soft iron or steel. It will be observed that the shield 3 includes a portion 3A extending over a portion of the front wall of the cover 101 to increase the electrical shielding action of the shield 3. Since magnetic shielding is desirable in electrical instruments, such as permanent-magnet moving-coil instruments, it is assumed that the shield 3 and the base plate 41 are formed of magnetically soft iron or steel. It should be observed that such material also affords some protection against alternating electrical fields. To insulate the instrument movement 37 magnetically from its container, the posts 43 and 47 may be formed of a non-magnetic material such as brass.

It is believed that the interchangeability of the covers 1 and 101 is apparent from the foregoing description thereof. To replace the cover 1 by the cover 101, the cover 1 is removed from its panel by detaching the machine screws 17 therefrom and the cover 101 is positioned in its place on the panel. When the screws 17 are actuated to attach the cover 101 to the panel, the shield 3 carried by the cover 101 surrounds the instrument movement 37 to protect the instrument movement. Such a cover replacement may be effected either at the factory or in the field.

Although the invention has been described with reference to certain specific embodiments thereof, numerous modifications are possible. Therefore, the invention is to be restricted only by the appended claims.

We claim as our invention:

1. In an electroresponsive measuring instrument assembly, a casing including a base member having a recess therein, and a panel member for closing the recess in said base member, means operable externally of said casing for attaching said panel member to said base member, said panel member having an opening therein permitting access to said recess, a cover member for said opening, said cover member including a light-permeable member for exposing a portion of an instrument positioned in said recess, and a shield member positioned to project from said cover member through said opening into said recess to surround an instrument positioned in said casing, said shield member having an opening displaced from said cover member to permit insertion of an instrument in said shield member while said shield member is attached to said cover member, a closure member for said shield member, said closure member, shield member and light-permeable member forming a substantially dust-proof container extending through the opening in said panel member into said recess, an electroresponsive instrument positioned within said container for exposure through said light-permeable member, and means attaching said instrument to said closure member for removal therewith relative to said cover member, said shield member being effective for shielding said instrument against fields produced by electric charges.

2. In a measuring instrument assembly, an electrical measuring instrument, a base plate, means securing said measuring instrument to said base plate, a magnetic shield member surrounding said measuring instrument, said shield member having a first open end engaging said base plate with a substantially dust-proof fit therebetween, said shield member having a second open end for exposing a portion of said instrument, a light-permeable member position adjacent said second open end, cover means engaging said shield member and said light-permeable member for completing therewith a substantially dust-proof container for said instrument, a panel member having an opening receiving said shield member, said panel member having a front face engaging said cover means, means operable from the rear of said panel member for securing said cover means to said panel member, means securing said base plate to said panel member and said shield member, auxiliary means supported on the rear face of said panel member for modifying the range of response of said instrument movement, terminal means accessible from the front of said panel member for connecting said instrument movement to an electrical circuit, and a casing having a recess closed by said panel member, said casing and said panel member forming a closure for said auxiliary means and the portion of said container in the rear of said panel member.

3. In a measuring instrument assembly, an electrical measuring instrument, a base plate, means securing said measuring instrument to said base plate, a magnetic shield member surrounding said measuring instrument, said shield member having a first open end engaging said base plate with a substantially dust-proof fit therebetween, said shield member having a second open end for exposing a portion of said instrument, a light-permeable member positioned adjacent said second open end, cover means engaging said shield member and said light-permeable member for completing therewith a substantially dust-proof container for said instrument, a panel member having an opening receiving said shield member, said panel member having a front face engaging said cover means, resilient means operable from the rear of said panel member for securing said cover means to said panel member, means securing said base plate to said panel member and said shield member, auxiliary means supported on the rear face of said panel member for modifying the range of response of said instrument, terminal means accessible from the front of said panel member for connecting said instrument to an electrical circuit, a casing having a recess closed by said panel member, said casing and said panel member forming a closure for said auxiliary means and the portion of said container in the rear of said panel member, and a cap member pivoted to said cover member for movement from a position enclosing to a position exposing said terminal means and said light-permeable member.

4. In a housing for electroresponsive measuring instruments, a casing including a base member having a recess therein, and a panel member for closing the recess in said base member, means operable externally of said casing for attaching said panel member to said base member, said panel member having an opening therein permitting access to said recess, a cover member for said opening, said cover member including a light-permeable member for exposing a portion of an instrument positioned in said recess, and a shield member positioned to project from said cover member through said opening into said recess to surround an instrument positioned in said casing, said shield member and said light-permeable member cooperating to provide a substantially dust-proof protective closure for an instrument positioned in said recess, said shield member being formed of a material suitable for shielding an instrument positioned therein from external electromagnetic fields, and said shield member having an opening displaced from said cover member, whereby an instrument may be inserted through said opening into proximity to said light-permeable member without disturbing the relationship between said shield member and said cover member.

5. In an electroresponsive measuring instrument assembly, a casing including a base member having a recess therein, and a panel member for closing the recess in said base member, means operable externally of said casing for attaching said panel member to said base member, said panel member having an opening therein permitting access to said recess, a cover member for said opening, said cover member including a light-permeable member for exposing a portion of an instrument positioned in said recess, and a shield member positioned to project from said cover member through said opening into said recess to surround an instrument movement positioned in said casing, said shield member having an opening displaced from said cover member to permit insertion of an instrument in said shield member while said shield member is attached to said cover member, a detachable closure member for said shield member, said closure member, shield member and light-permeable member forming a substantially dust-proof container extending through the opening in said panel member into said recess, an electroresponsive instrument positioned within said container for exposure through said light-permeable member, and means attaching said instrument to said closure member for removal therewith relative to said cover member, said shield member and said closure member being formed of a material suitable for shielding said instrument from electromagnetic fields.

6. In an electroresponsive measuring instrument housing, a casing including a base member having a recess therein, and a panel member for closing the recess in the base member, said panel member having an opening therein permitting access to said recess, a cover member for said recess, means detachably securing said cover member to the base member, said cover member including a light-permeable member for exposing a portion of an instrument positioned in the casing, and a shield member projecting from the cover member into the recess for substantially surrounding and shielding from fields produced by electric charges an instrument positioned in the casing, said shield member being secured in substantially fixed position to the cover member for removal as a unit therewith from said panel member.

7. In an electroresponsive measuring instrument housing, a casing including a base member having a recess therein, and a panel member for closing the recess in the base member, said panel member having an opening therein permitting access to said recess, a cover member for said recess, means detachably securing said cover member to the base member, said cover member including a light-permeable member for exposing a portion of an instrument positioned in the casing, a tubular shield member projecting from the cover member into the recess for substantially surrounding and shielding from fields produced by electric charges an instrument positioned in the casing, said shield member being permanently secured with a substantially dust-proof union to the cover member for removal as a unit therewith from the panel member, and a closure member for said tubular shield member, said cover member, shield member and closure member forming a container for an instrument.

DOUGLASS A. YOUNG.
VERON S. THOMANDER.